United States Patent
Morooka

(10) Patent No.: US 8,019,792 B2
(45) Date of Patent: Sep. 13, 2011

(54) INFORMATION PROCESSING APPARATUS AND INFORMATION PROCESSING METHOD

(75) Inventor: Hidekazu Morooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1246 days.

(21) Appl. No.: 11/610,655

(22) Filed: Dec. 14, 2006

(65) Prior Publication Data

US 2007/0143354 A1 Jun. 21, 2007

(30) Foreign Application Priority Data

Dec. 20, 2005 (JP) ................................ 2005-365902

(51) Int. Cl.
G06F 7/00 (2006.01)
(52) U.S. Cl. ...................................... 707/802; 707/828
(58) Field of Classification Search .................. 707/828, 707/829, 609, 802, 812
See application file for complete search history.

(56) References Cited

U.S. PATENT DOCUMENTS

| 6,332,146 | B1 * | 12/2001 | Jebens et al. ........................... 1/1 |
| 7,487,155 | B2 * | 2/2009 | Jebens et al. ........................... 1/1 |
| 7,606,922 | B2 * | 10/2009 | Matsuo ........................ 709/230 |
| 7,783,695 | B1 * | 8/2010 | Tyrrell et al. .................. 709/201 |
| 2003/0208565 | A1 * | 11/2003 | Nishihara et al. ............. 709/219 |
| 2004/0105104 | A1 * | 6/2004 | Ishikawa et al. ............... 358/1.6 |
| 2005/0246631 | A1 * | 11/2005 | Mori et al. .................... 715/515 |
| 2006/0212485 | A1 * | 9/2006 | Suenaga et al. ............... 707/200 |

FOREIGN PATENT DOCUMENTS

| JP | 11-205379 A | 7/1999 |
| JP | 2005-216201 A | 8/2005 |

* cited by examiner

Primary Examiner — Angela M Lie
(74) Attorney, Agent, or Firm — Canon U.S.A. Inc., I.P. Division

(57) ABSTRACT

When a hot folder monitoring section detects entry of a data file into a hot folder, a job ticket creating section creates a print job for the entered data file. A print data transmitting section transmits the created print job to a printer. If the hot folder monitoring section determines that the data file is entered from an input source folder to the hot folder, the print system transfers the data file to the input source folder.

8 Claims, 15 Drawing Sheets

FIG. 7

| HOT FOLDER SETTINGS | | |
|---|---|---|
| HOT FOLDER NAME : | FOLDER 01 ——— 1701 | |
| MONITORING OF HOT FOLDER : | ● REQUIRED<br>○ NOT REQUIRED | } 1702 |
| INTERVAL OF MONITORING : | [____] SEC | |
| OUTPUT PAPER SIZE | A4 ▼ | |
| ORIENTATION OF PAPER | PORTRAIT ▼ | |
| PAGE LAYOUT | 1 PAGE/SEC ▼ | } 1703 |
| PRINT METHOD | ONE-SIDED PRINT ▼ | |
| RESOLUTION | 600dpi ▼ | |
| [PRINT DATA ENTRY/ LOG FILE PROCESSING SETTINGS]<br>1704 | [OK]<br>1705 | [CANCEL]<br>1706 |

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

A server or a client can transmit print data to a printing apparatus. In a print operation, a hot folder can be used to simplify routine work. For example, as discussed in Japanese Patent Application Laid-Open No. 11-205379, a hot folder with predetermined print settings (e.g., page layout and print paper size) can be prepared beforehand. Then, a print job can be automatically created based on print data when the print data is input into the hot holder.

Input (entry) of the print data into the hot folder can be carried out with a drag and drop operation by a user who intends to shift a target file (i.e., a file to be printed) into the hot folder.

However, according to the operation system of Windows®, the drag and drop operation of a file, if performed within the same drive, is regarded as an instruction for moving (migrating) the file from one folder to another folder both belonging to the same drive. For example, when a user drags and drops a file "A" from a folder "B" to a folder "C" in the same drive, the system moves the file "A" to the folder "C" and leaves no data of the file "A" in the folder "B."

Thus, in a print operation, if a user drags and drops the file "A" (print data) from the folder "B" to the hot folder in the same drive, the file "A" is completely moved from the folder "B" to the hot folder and no data of the file "A" remains in the folder "B" (i.e., a move source).

In the context of the present disclosure, the action for completely transferring a file from one folder to another folder while leaving no file having the same contents in the original folder is referred to as a "move" action. On the other hand, the action for creating a new file having the same contents in another folder without erasing the file in the original folder is referred to as a "copy" action.

Furthermore, the settings of a hot folder may include deletion of entered file data after the print processing of the file data is accomplished or a print job is created. Accordingly, not only the file data is erased from the move source (i.e., input source) but also no data may remain in the hot folder when the print processing or the print job creation is accomplished. To avoid such an accident, a user is required to perform complicated work for copying file data beforehand or when the file is input into the hot folder.

The settings of a hot folder may allow a user to leave a backup file. However, the backup operation is generally performed by simply storing the file data into a designated folder after the file data entered into the hot folder is processed. Therefore, backup files may form a huge database. Retrieving a target file may be difficult and complicated.

Moreover, as another complicated work, a user is required to open a job management application and check or confirm, on a user interface (UI), the print status (i.e., processing result) of the print data entered in the hot folder.

SUMMARY OF THE INVENTION

Exemplary embodiments of the present invention are directed to an information processing apparatus and an information processing method.

Furthermore, exemplary embodiments are directed to an information processing apparatus and an information processing method capable of improving the usability of the information processing apparatus without requiring complicated processing for a data file entered in a processing folder.

According to an aspect of the present invention, an information processing apparatus includes: a determination unit configured to determine entry of a data file into a processing folder; a job processing unit configured to execute a data processing job using the data file, in a case where the data file is entered into the processing folder, based on action setting information corresponding to the processing folder; and a transfer unit configured to, in a case where the determination unit determines that the data file has been entered from an input source folder to the processing folder, transfer the entered data file into the input source folder.

According to another aspect of the present invention, an information processing apparatus includes: a determination unit configured to determine entry of a data file into a processing folder; a job processing unit configured to execute a data processing job using the data file, in a case where the data file is entered into the processing folder, based on action setting information corresponding to the processing folder; and a log storage unit configured to store, into an input source folder of the data file, log information of the data processing job including storage location information of the data file entered into the processing folder.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a hot folder setting screen according to an exemplary embodiment.

DETAILED DESCRIPTION OF THE EMBODIMENTS

Figure 1:
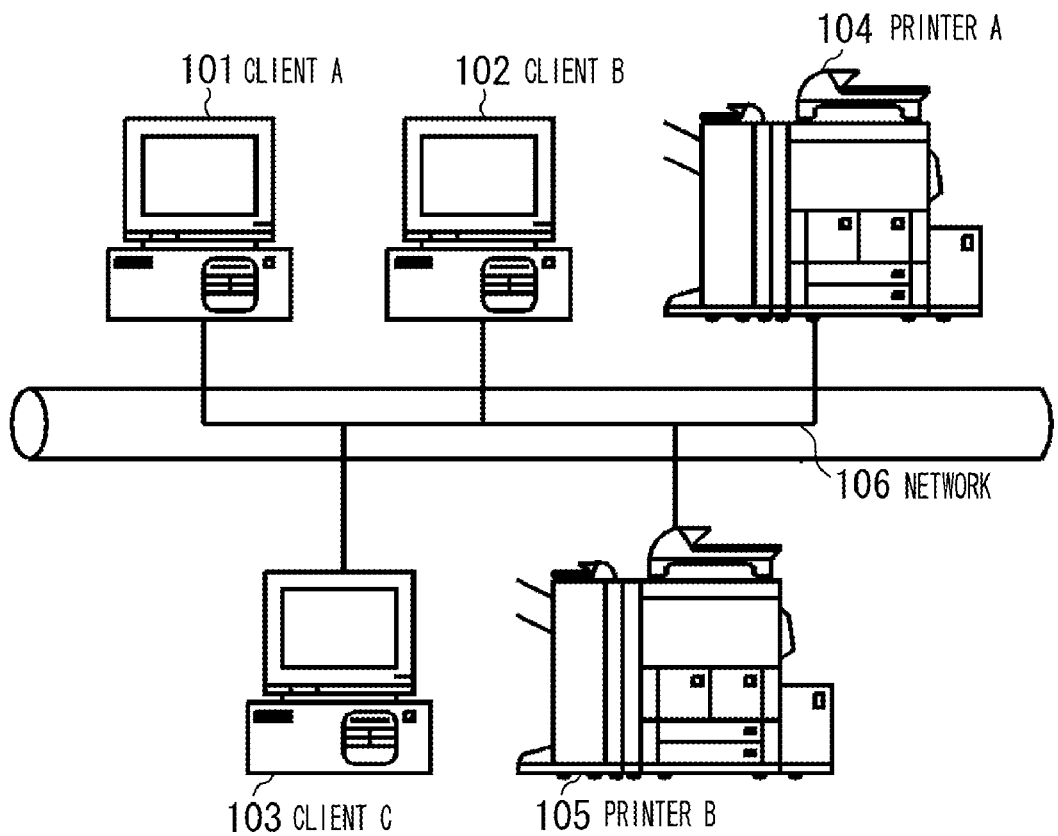
FIG. 1 illustrates an arrangement of a print system according to an exemplary embodiment of the present invention.

The following description of exemplary embodiments is merely illustrative in nature and is in no way intended to limit the invention, its application, or uses.

Processes, techniques, apparatuses, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is described with reference to one figure, it may not be discussed for following figures.

Exemplary embodiments will be described in detail below with reference to the drawings.

First Exemplary Embodiment

<Exemplary Configuration of Print System>

FIG. 1 illustrates an arrangement of a print system according to an exemplary embodiment of the present invention. For a better understanding of the present invention, various exemplary embodiments will be described based on the attached drawings illustrating a print system. However, the application of the present invention is not limited to print systems.

In FIG. 1, client computers (i.e., clients) 101, 102, and 103 are connected to a network 106 via Ethernet network cables. The clients 101, 102, and 103 are network computers, such as personal computers (PCs), which can communicate with each other.

The client 101, 102, and 103 can execute various programs, including application programs, and can transfer print data to network printers 104 and 105.

Each of the network printers 104 and 105, capable of functioning as a print control apparatus, is connected via a network interface (not shown) to the network 106. The network printers 104 and 105 can analyze a print job including print data transmitted from the client computers 101, 102, and 103. The network printers 104 and 105 can convert the print data into dot images on a page-by-page basis and can print the images on printing sheets. The functions of respective network printers may be different. The network 106 is connected to the computers 101, 102, and 103 and the network printers 104 and 105.

<Exemplary Hardware Arrangement of Network Computer>

Figure 2:
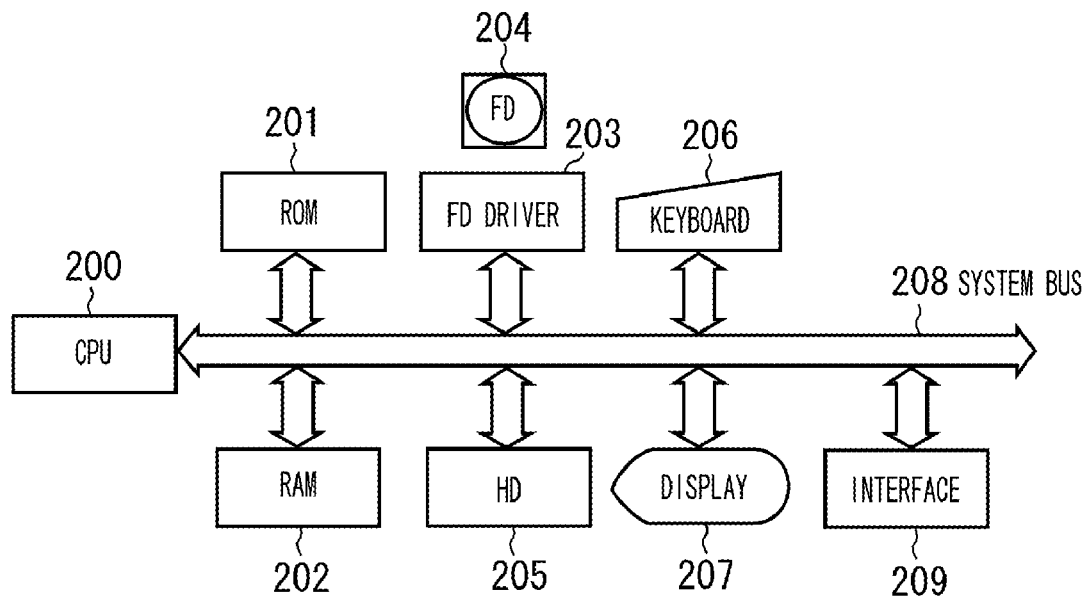
FIG. 2 is a block diagram illustrating an exemplary configuration of a client computer shown in FIG. 1.

FIG. 2 is a block diagram illustrating an exemplary configuration of the client computers 101, 102, and 103 shown in FIG. 1.

In FIG. 2, a central processing unit (CPU) 200 can perform control of the computer. The CPU 200 can load various programs stored in a flexible (floppy) disk (FD) 204 or a hard disk (HD) 205 into a random access memory (RAM) 202 and can execute the loaded programs. The RAM 202 can temporarily store information and files required to execute the programs. The programs executed by the CPU 200 include application programs, printer driver programs, an operating system (OS), and network printer control programs of the present exemplary embodiment.

A read only memory (ROM) 201, functioning as a storage unit, can store various data including a basic input/output (I/O) program and other programs, as well as font data and template data used for processing documents. The RAM 202 not only functions as a temporary storage unit but also functions as a main memory or a work area of the CPU 200.

A flexible disk (FD) drive 203 is a reading unit capable of reading from a storage medium. Through the FD drive 203, as shown in later-described FIG. 5, programs stored in the FD 204 (i.e., a storage medium) can be loaded into the computer.

The FD 204 is a storage medium capable of storing computer-readable programs. In the present exemplary embodiment, the storage medium is not limited to a flexible disk. For example, it can be any one of a compact disk-ROM (CD-ROM), a CD-recordable (CD-R), a CD-rewritable (CDRW), a PC card, a digital versatile disk (DVD), e.g., a DVD-ROM or DVD-R, an integrated circuit (IC) memory card, a magneto-optical (MO) disc, and a memory stick.

A hard disk (HD) 205 is a bulk memory (one of external storage units) capable of storing application programs, printer driver programs, an operating system (OS), control programs, and related programs. The HD 205 can also store hot folders.

A keyboard 206, functioning as an instruction input unit, enables a user to input commands and instructions to the client computer and also enables an operator or an administrator to input control commands of devices to a print server. A display unit 207 can display the commands entered from the keyboard 206 and also display the operating state of a printer.

A system bus 208 can manage the flow of data in the computer. An interface 209, functioning as an input/output unit, can control data transmission/reception processing performed between the computer and an external apparatus.

The computer configuration is not limited to the example shown in FIG. 2. For example, the storage location of data and programs can be any one of a ROM, a RAM, and an HD.

Figure 3:
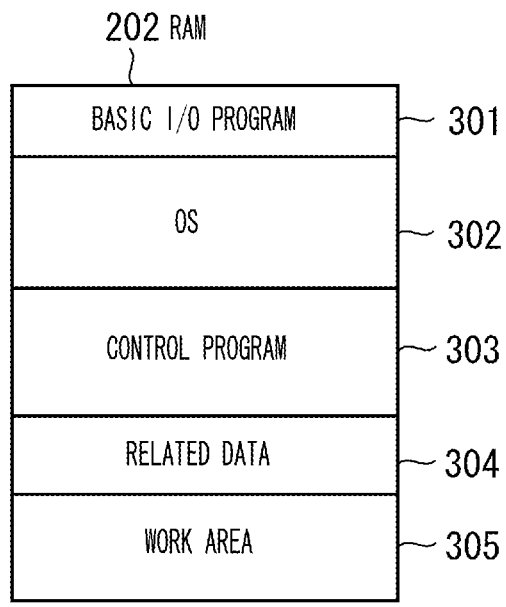
FIG. 3 illustrates an example of a memory map of a random access memory (RAM) shown in FIG. 2.

FIG. 3 illustrates an example of a memory map of the RAM 202 shown in FIG. 2. The memory map shown in FIG. 3 is in a state where a control program has been loaded from the FD 204 into the RAM 202 and has become executable by the CPU 200.

In the present exemplary embodiment, the CPU 200 executes the control programs and related data directly loaded from the FD 204 into the RAM 202. The CPU 200 can also execute control programs read out of the HD 205 which were installed from the FD 204.

Additionally, the medium storing the control programs is not limited to a flexible disk and can be any one of a CD-ROM, a CDR, a PC card, a DVD, and an IC memory card. It is also useful to store the control programs in the ROM 201 as part of a memory map so that the CPU 200 can directly execute the control programs. Moreover, instead of using a hardware arrangement, a software arrangement capable of realizing the functions of the above-described devices can be used.

A basic I/O program 301 includes an initial program loading (IPL) function for loading an operating system (OS) 302 from the HD 205 into the RAM 202 in response to power ON of the computer and starting the action of the OS 302.

The OS 302, a control program 303, and related data 304 can be stored in predefined areas of the RAM 202. A work area 305 is provided for the CPU 200 that executes the control program 303.

Figure 4:
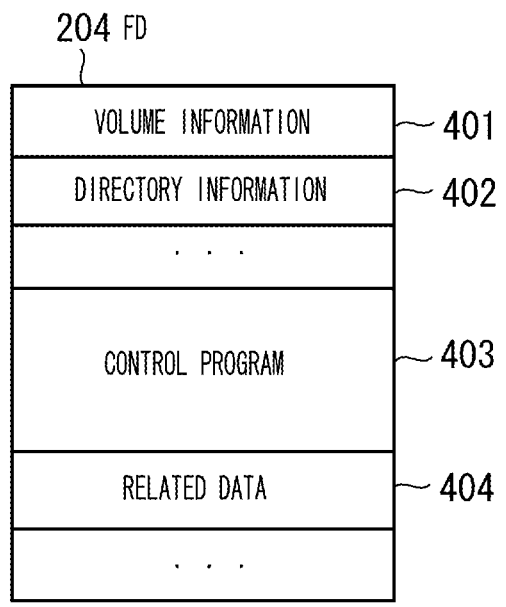
FIG. 4 illustrates an example of a memory map of a flexible (floppy) disk (FD) shown in FIG. 2.

FIG. 4 illustrates an example of a memory map of the FD 204 shown in FIG. 2.

The memory map of FIG. 4 includes volume information 401 representing information relating to data, directory information 402, a control program 403 described in the exemplary embodiment, and related data 404. The control program 403 can be created based on flowcharts described in the present exemplary embodiment. In the present exemplary embodiment, both the clients and servers have similar memory maps.

Figure 5:
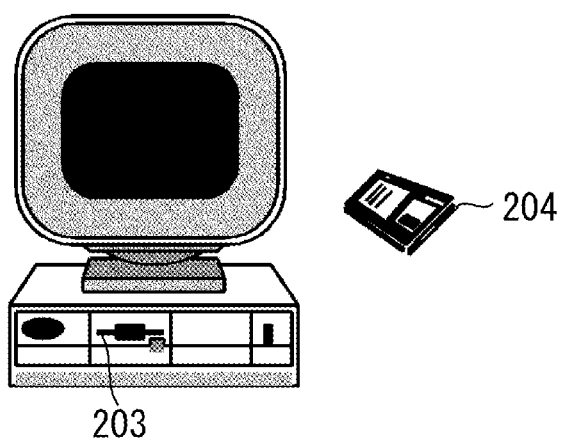
FIG. 5 illustrates an FD drive shown in FIG. 2 and an FD that can be inserted into the FD drive.

FIG. 5 illustrates the FD drive 203 shown in FIG. 2 and the FD 204 that can be inserted into the FD drive.

In FIG. 5, the FD 204 can store the control program and related data described in the present exemplary embodiment as shown in FIG. 4.

<Exemplary Software Arrangement>

Figure 6:
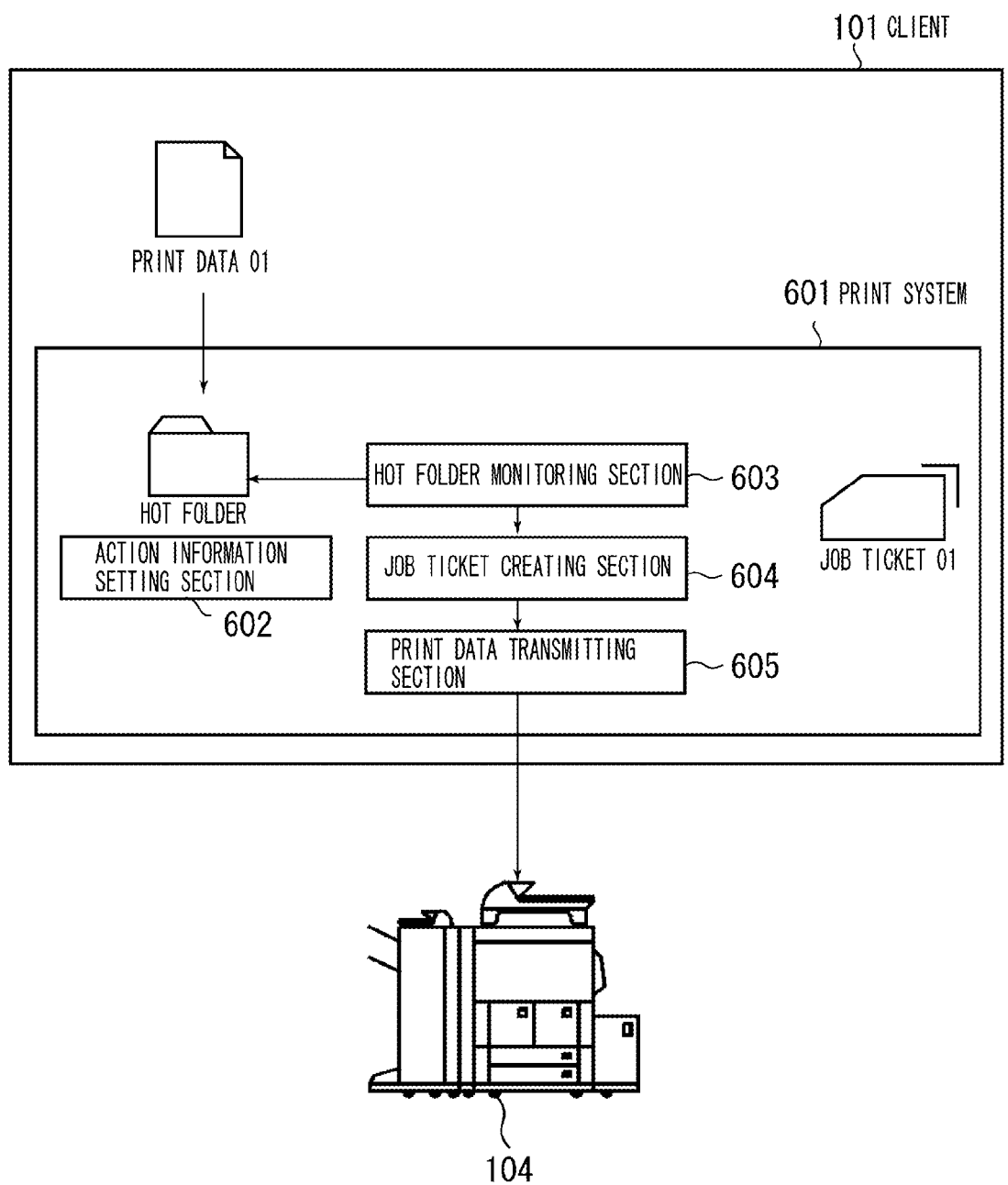
FIG. 6 illustrates the configuration of functional modules of the print system according to an exemplary embodiment.

FIG. 6 illustrates the configuration of functional modules of the print system 601 according to an exemplary embodiment.

In FIG. 6, the print system 601 can process print data 01 entered into a hot folder of the client 101.

Figure 8:
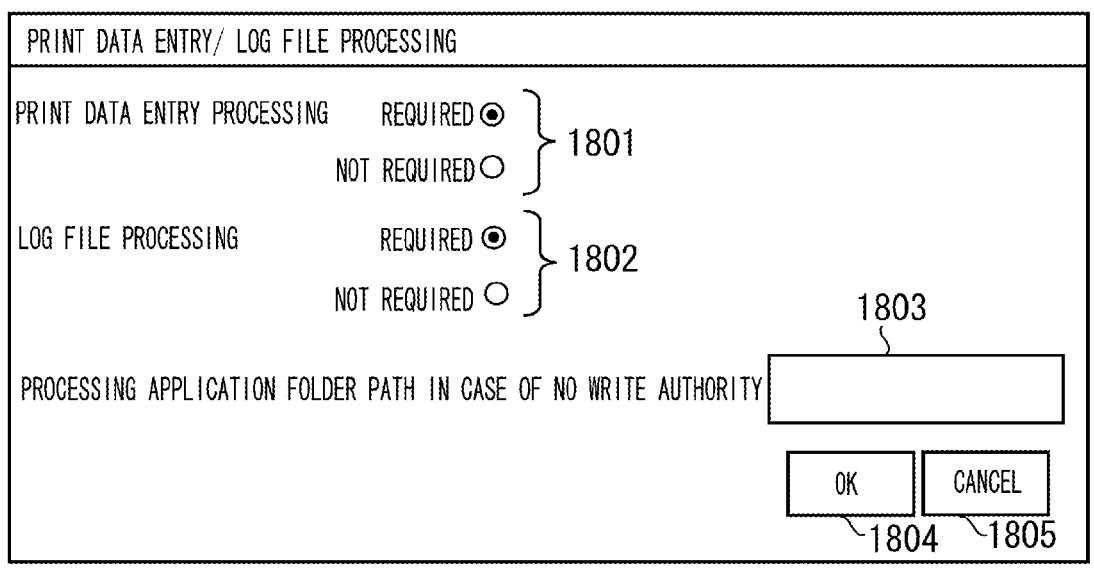
FIG. 8 illustrates an example of a print data entry/log file processing setting screen according to an exemplary embodiment.

The print system 601 includes an action information setting section 602 having operation screens shown in FIGS. 7 and 8 which enable a user to perform monitoring settings of a hot folder, processing settings of input print data and log file, and print settings of entered print data.

A hot folder monitoring section 603 can monitor, at predetermined time intervals, the input (entry) of print data 01 into the hot folder based on the monitoring settings defined by the action information setting section 602. More specifically, the hot folder monitoring section 603 periodically obtains a file list of the hot folder and checks the input (entry) of print data based on differences between a previous list and the present list.

The input (entry) of print data into the hot folder is not limited to a drag and drop operation performed by a user on the hot folder, and includes any other user's operation if the hot folder monitoring section 603 can detect the input (entry) of print data. For example, a user may copy a file (i.e., a print object) to the hot folder or may input a command for moving a target file.

A job ticket creating section 604 can create a job ticket 01 including print settings defined by the action information setting section 602 for the print data 01 entered in the hot folder.

A print data transmitting section 605 can transmit, to the printer 104, the print data 01 entered in the hot folder and the job ticket 01 created by the job ticket creating section 604. In the present exemplary embodiment, the print data transmitting section 605 directly transmits the print data to the printer 104. However, it is useful to integrate the print data as a single job on an appropriate program (not shown) of the client 101 or another system and register a print job to execute a print operation.

The CPU 200 shown in FIG. 2 can load a program stored in the FD 204 (refer to FIG. 4) into the RAM 202 (refer to FIG. 3) and execute the loaded program so as to realize the print system 601 shown in FIG. 6.

FIG. 7 illustrates an example of a hot folder setting screen according to an exemplary embodiment. The action information setting section 602 shown in FIG. 6 can control the display unit 207 to display the hot folder setting screen of FIG. 7.

Each hot folder can be identified by a hot folder name 1701. The hot folder setting screen shown in FIG. 7 can be provided for each hot folder to enable a user to define action settings for each hot folder.

A monitor setting field 1702 of the hot folder enables a user to determine whether monitoring of the hot folder is "required" or "not required" and also enables a user to set the interval of monitoring. A print information setting field 1703 enables a user to set print information including output paper size, orientation of paper, page layout, output method, and resolution.

When a user clicks an OK button 1705 with a pointing device (not shown), the action information setting section 602 makes effective the setting information on the hot folder setting screen (i.e., setting information shown in FIGS. 7 and 8) and terminates the hot folder setting screen. The action information setting section 602 can control the HD 205 to store the finalized setting information (i.e., setting information shown in FIGS. 7 and 8).

When a user clicks a cancel button 1706 with the pointing device (not shown), the action information setting section 602 cancels the setting information on the hot folder setting screen (i.e., setting information shown in FIGS. 7 and 8) and terminates the hot folder setting screen.

When a user clicks a print data entry/log file processing settings button 1704 with the pointing device (not shown), the display unit 207 displays a print data entry/log file processing setting screen shown in FIG. 8.

FIG. 8 illustrates an example of the print data entry/log file processing setting screen according to an exemplary embodiment. The action information setting section 602 shown in FIG. 6 can control the display unit 207 to display the print data entry/log file processing setting screen.

In FIG. 8, a field 1801 enables a user to determine whether the print data entry processing is "required" or "not required." When the print data entry processing is "required", the print system 601 performs processing for moving entered print data into an entry source. On the other hand, when the print data entry processing is "not required", the print system 601 does not perform processing for moving entered print data into an entry source.

Figure 9:
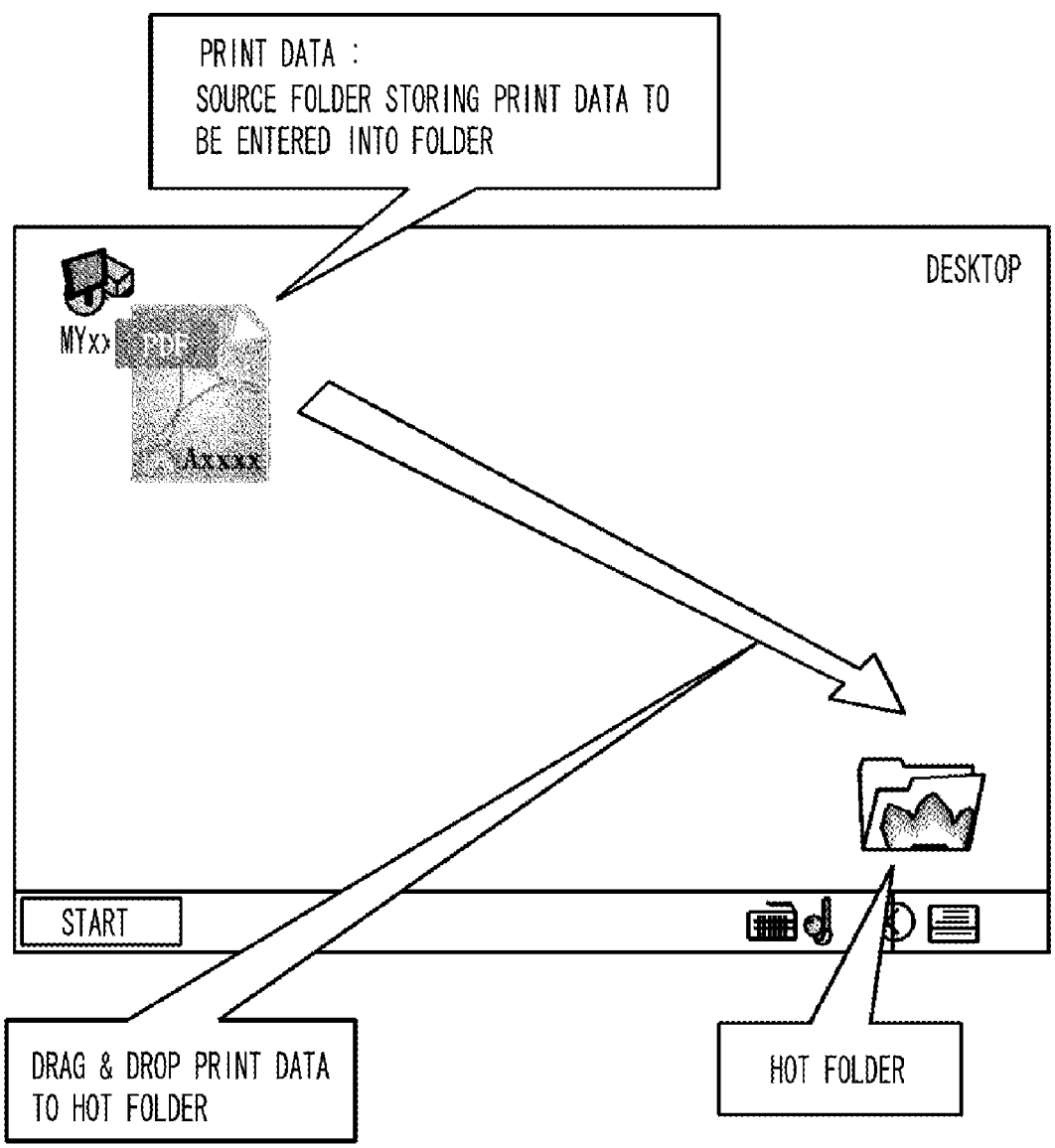
FIG. 9 illustrates an example of a hot folder and an input source folder according to an exemplary embodiment.

In the context of the present disclosure, the original folder of print data entered into the hot folder is referred to as an "input source folder" when a user performs a drag and drop operation of a file. FIG. 9 shows an exemplary relationship between a hot folder and an input source folder.

The print data entry processing is not limited to a "move" action and, therefore, may include storage processing for creating, in the input source folder, a shortcut to access the print data (i.e., a file including path information identifying a storage place of the print data file) or storage processing for copying the print data in the input source folder. Namely, the print data entry processing includes any other storage processing for storing the print data into the input source folder so that users can access the input source folder to reuse the print data.

A field 1802 enables a user to determine whether the log file processing is "required" or "not required." When the log file processing is "required", the print system 601 creates a print processing log file in the input source folder. On the other hand, when the log file processing is "not required", the print system 601 does not create a print processing log file in the input source folder.

A field 1803 enables a user to input a processing application folder path available if the user has no write authority for the input source folder. Thus, if no write authority for the input source folder is present, a user can create or update a log file as an alternate folder of the input source folder by designating a path of a folder storing a print data file through the field 1803 so that the print data can be reused.

When a user clicks an OK button 1804 with the pointing device (not shown), the action information setting section 602 makes effective the setting information on the print data entry/log file processing setting screen and terminates the print data entry/log file processing setting screen.

When a user clicks a cancel button 1805 with the pointing device (not shown), the action information setting section 602 cancels the setting information on the print data entry/log file processing setting screen and terminates the print data entry/log file processing setting screen.

The processing of the print system 601 according to present exemplary embodiment will be described with reference to FIGS. 10 through 12.

Figure 10:
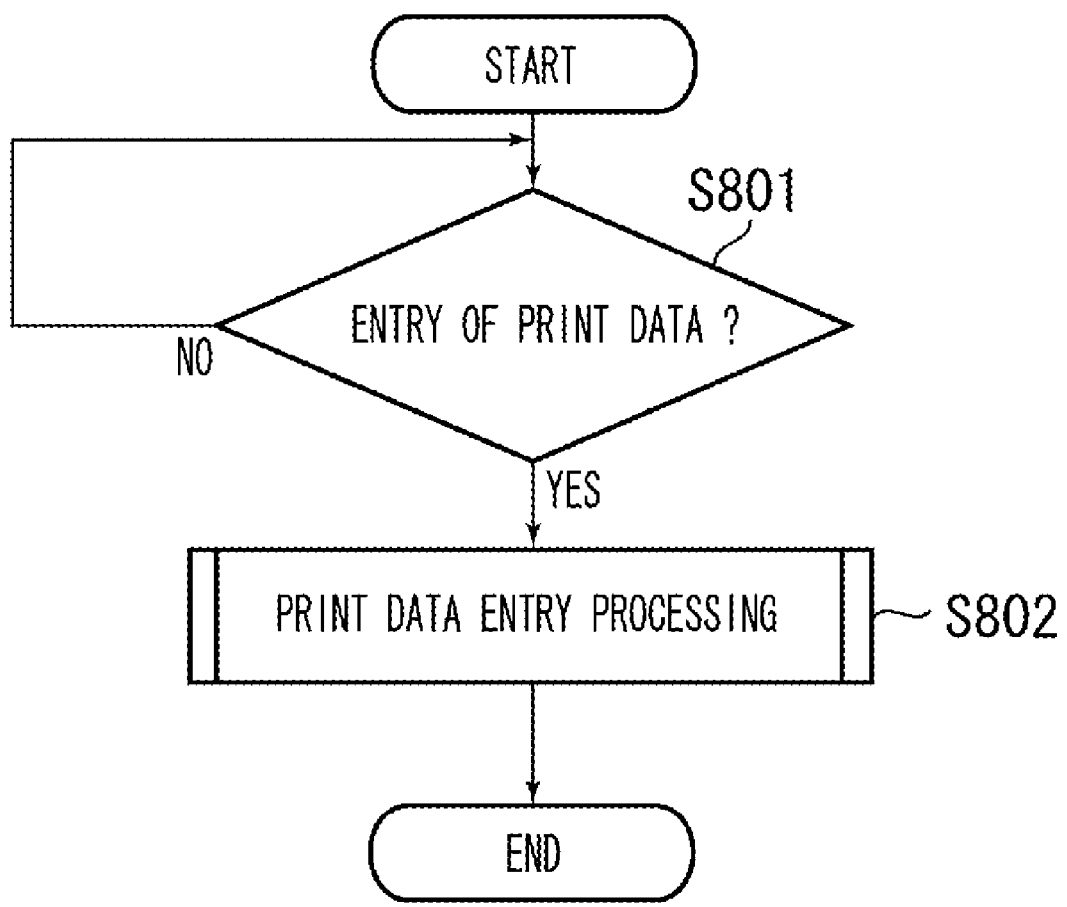
FIG. 10 is a flowchart showing an example of a control processing procedure according to an exemplary embodiment.

FIG. 10 is a flowchart showing an example of a control processing procedure according to an exemplary embodiment. The processing shown in FIG. 10 corresponds to sequential processing performed in the print system 601.

More specifically, in the print system 601, the hot folder monitoring section 603 detects input (entry) of print data into the hot folder. The job ticket creating section 604 creates a job ticket. The print data transmitting section 605 transmits the print data and the job ticket to the printer 104. The processing shown in the flowchart of FIG. 10 can be performed when the monitoring of a hot folder is "required" in the settings of the hot folder shown in FIG. 7.

First, in step S801, the hot folder monitoring section 603 determines whether any print data (i.e., a data file to be printed) is entered into the hot folder. The hot folder monitoring section 603 can continuously execute the monitoring processing of step S801. If print data is entered (i.e., stored in the hot folder), the processing flow proceeds to step S802.

In step S802, the print system 601 executes print data entry processing and then terminates the processing of this routine. Details of the print data entry processing will be described with reference to FIG. 11.

Figure 11:
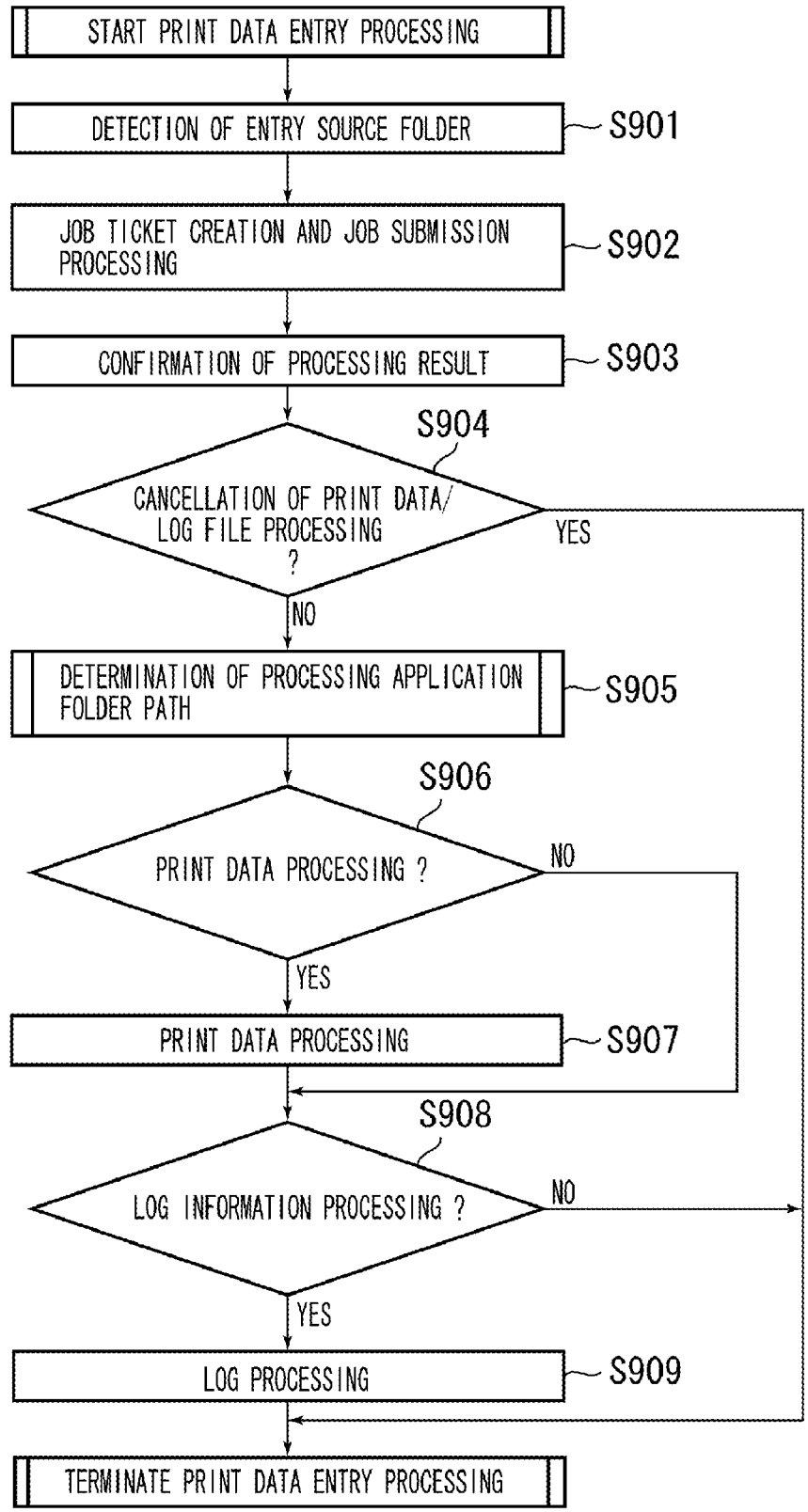
FIG. 11 is a flowchart showing an example of another control processing procedure according to an exemplary embodiment.

FIG. 11 is a flowchart showing an example of another control processing procedure according to an exemplary embodiment. The processing shown in FIG. 11 corresponds to the print data entry processing performed in step S802 of FIG. 10.

First, in step S901, the hot folder monitoring section 603 detects any "input source folder" of print data entered by a drag and drop operation. In the present step, the hot folder monitoring section 603 determines whether the input processing of print data from the detected input source folder to the hot folder is "move" of print data or "copy" of print data.

Furthermore, the hot folder monitoring section 603 determines whether the write authority for the input source folder is present.

The following method can be used to determine whether the print data is "moved" or "copied."

If the input source folder and the hot folder are present in the same hard disk or in the same drive (for example, when both the input source folder and the hot folder are present in a "C" drive), the hot folder monitoring section 603 determines that the print data is "moved." On the other hand, when the input source folder and the hot folder are not present in the same hard disk or in the same drive, the hot folder monitoring section 603 determines that the print data is "copied."

Additionally, any system commands relating to the print data entry processing (e.g., "move" command and "copy" command) can be used to determine whether the input processing of print data is "move" of print data or "copy" of print data.

Second, in step S902, the job ticket creating section 604 confirms whether the entered print data has an appropriate file format that the printer 104 can interpret. Then, the job ticket creating section 604 executes a data processing job. More specifically, the job ticket creating section 604 creates a job ticket based on print settings defined by the action information setting section 602 (refer to items 1703 in FIG. 7).

Furthermore, the print data transmitting section 605 transmits the job ticket and the print data to the printer 104 (referred to as "job submission processing"). In this manner, the job ticket creating section 604 processes the print data (i.e., transmits the job ticket together with the print data to the printer 104) to enable the printer 104 to execute the print job. When the entered print data does not have an appropriate data format, the job ticket creating section 604 and the print data transmitting section 605 cancel the job ticket creation processing and the job submission processing.

Next, in step S903, the print system 601 confirms the processing result in the job submission processing performed in step S902. In the present step, the print system 601 confirms error contents (e.g., data format error and job transmission error) in the job ticket creation processing and the job submission processing performed in step S902 and stores the confirmed contents in the RAM 202.

Next, in step S904, the print system 601 determines whether both the print data entry processing and the log file processing are not required, based on the settings defined by the action information setting section 602 (refer to items 1801 and 1802 in FIG. 8). If neither the print data entry processing nor the log file processing are required (i.e., YES in step S904), the print system 601 terminates the processing of this routine. According to the flowchart shown in FIG. 11, the processing of step S904 is performed after accomplishing the processing of step S903. However, the processing of step S904 can be performed immediately after the print data is entered.

On the other hand, if either the print data entry processing or the log file processing is required (i.e., NO in step S904), the processing flow proceeds to step S905.

In step S905, the print system 601 determines a processing application folder path. The processing application folder path determination processing performed in step S905 will be described in detail with reference to the flowchart of FIG. 12.

Here, the processing application folder path determination processing of step S905 will be described below with reference to the flowchart of FIG. 12.

Figure 12:
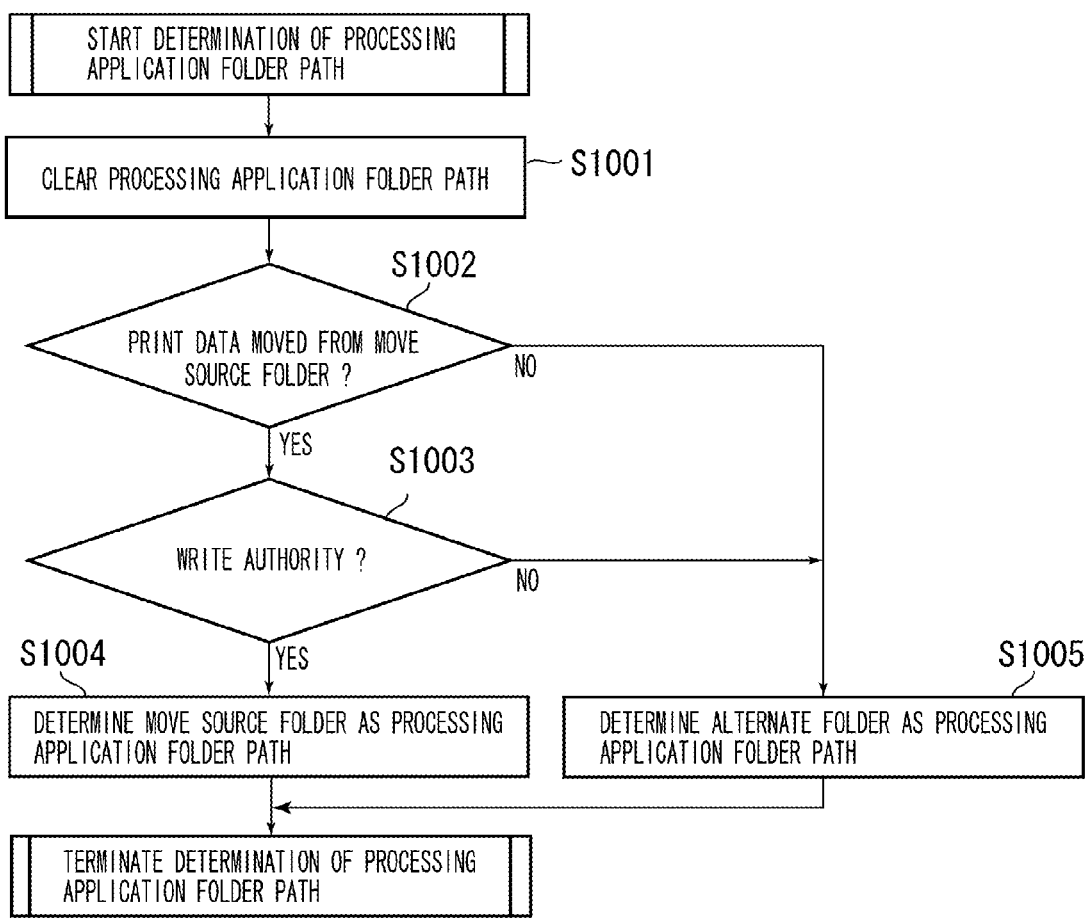
FIG. 12 is a flowchart showing an example of another control processing procedure according to an exemplary embodiment.

FIG. 12 is a flowchart showing an example of a control processing procedure according to an exemplary embodiment. The processing shown in FIG. 12 corresponds to processing application folder path determination processing performed in step S905.

First, in step S1001, the print system 601 clears the information relating to any processing application folder path stored in a predetermined area of the RAM 202.

Second, in step S1002, the print system 601 determines whether the input (entry) of print data into the hot folder has been performed as "move" or "copy" of print data from a move source folder (i.e., input source folder). If the print data has been moved from the move source folder into the hot folder (i.e., YES in step S1002), the processing flow proceeds to step S1003.

Next, in step S1003, the print system 601 confirms the write authority for the move source folder. When the write authority is confirmed (i.e., YES in step S1003), the processing flow proceeds to step S1004.

In step S1004, the print system 601 determines the move source folder as a processing application folder path and stores the determined path in the RAM 202 and terminates the processing of this routine.

On the other hand, if the print data has been copied from the move source folder into the hot folder (i.e., NO in step S1002) or when no write authority is confirmed (i.e., NO in step S1003), the processing flow proceeds to step S1005.

In step S1005, the print system 601 reads the processing application folder path of the print data. More specifically, the print system 601 determines the file path set in the action information setting section 602 (refer to item 1803 of FIG. 8) as a processing application folder path and stores the determined path in the RAM 202. In other words, the print system 601 selects an alternate folder (i.e., the file path set beforehand by the action information setting section 602) if no write authority for the input source folder is confirmed. Then, the print system 601 terminates the processing of this routine.

Now referring back to the processing of the flowchart shown in FIG. 11, after the processing application folder path determination processing is terminated, the print system 601 determines whether print data processing (which is later described) can be executed (refer to step S906).

In the present step, the print system 601 determines execution of the print data processing if the action information setting section 602 (refer to item 1801 shown in FIG. 8) determines that the print data processing is "required" and no error is detected in the above-described processing in step S903.

It is also useful that the print system 601 determines execution of the print data processing if the action information setting section 602 (refer to item 1801 shown in FIG. 8) determines that the print data processing is "required" regardless of a detection result with respect to the presence of error.

Furthermore, any other settings instructing the print data processing can be used if the action information setting section 602 cannot directly set the necessity of the print data processing.

Then, if the print data processing can be executed (i.e., YES in step S906), the print system 601 executes the print data processing (e.g., processing for storing the entered print data) in step S907. The storage processing can be processing for moving the print data to the input source folder, processing for creating a shortcut to access the input source folder (i.e., a file including path information identifying a storage location of a print data file), or processing for copying the print data to the input source folder.

In short, the print system 601 can execute any storage processing for enabling users to access the input source folder to reuse the print data. Then, the processing flow proceeds to step S908. In the present exemplary embodiment, instead of moving the print data, it is useful to copy the input print data to the processing application folder path.

On the other hand, when print data processing cannot be executed (i.e., NO in step S906), the processing flow directly proceeds to step S908.

Next, in step S908, the print system 601 determines whether the log information processing can be executed. In the present step, the print system 601 determines execution of the log information processing if the action information setting section 602 (refer to item 1802 shown in FIG. 8) determines that the log file processing is "required" and no error is detected in the above-described processing in step S903.

It is also useful that the print system 601 determines execution of the log information processing if the action information setting section 602 (refer to item 1802 shown in FIG. 8) determines that the log file processing is "required" regardless of a detection result with respect to the presence of error.

If the log information processing can be executed (i.e., YES in step S908), the print system 601 executes the log processing (i.e., creates log information relating to print job processing of input print data and stores the created information in the processing application folder path) in step S909. Then, the print system 601 terminates the processing of this routine.

On the other hand, when the log information processing cannot be executed (i.e., NO in step S908), the print system 601 terminates the processing of this routine.

In the present exemplary embodiment, the user interface of the action information setting section requires a user to designate beforehand a processing application folder path selectable in the case of no write authority for the input source folder. However, it is also useful to confirm the presence of a write authority for the input source folder in step S901 and display a message indicating no presence of write authority to let a user input an alternate path.

As described above, according to the present exemplary embodiment, after the job processing of print data (i.e., a data file to be printed) entered into the hot folder is accomplished, the print data can be automatically (without any intentional operation by a user) returned to the print data move source (input source) folder.

Thus, compared to the conventional system, no complicated work (e.g., backup copy of an input file as a preparatory work and retrieval of the file as a post-processing work) is required to reuse the input file. Furthermore, the processing state and result can be easily confirmed by checking the presence or contents of a log file. Thus, the usability of the print system can be greatly improved.

Accordingly, the present exemplary embodiment can realize a print system using a hot folder with higher usability compared to the conventional system.

Second Exemplary Embodiment

The above-described first exemplary embodiment can perform the processing for returning (moving and saving) print data and a log file to the input source folder in response to entry of the print data into the hot folder.

It is useful to create a history folder as a subordinate holder of the input source folder and move and save the entered print data and the log file into the history folder. In the following description, differences between the second exemplary embodiment and the above-described first exemplary embodiment will be described in detail with reference to the drawings. In the context of the disclosure of the second exemplary embodiment, a hot folder into which print data is entered is referred to as a target hot folder.

The processing of the print system 601 according to the second exemplary embodiment will be described below with reference to FIGS. 13 and 14.

Figure 13:
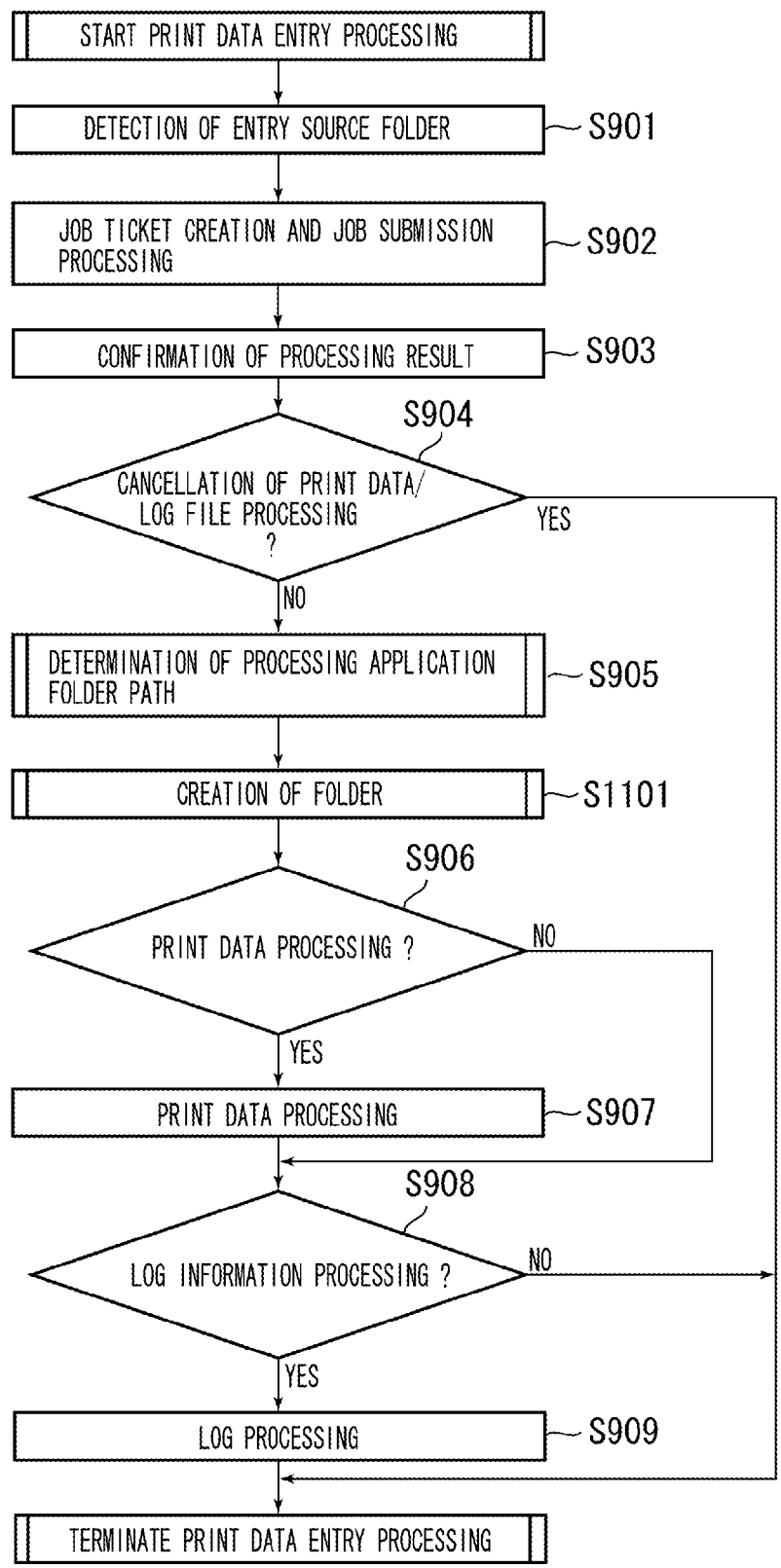
FIG. 13 is a flowchart showing an example of another control processing procedure according to an exemplary embodiment.

FIG. 13 is a flowchart showing an example of a control processing procedure according to an exemplary embodiment. The processing shown in FIG. 13 corresponds to the print data entry processing performed in step S802 of FIG. 10. In FIG. 13, steps similar to the steps shown in FIG. 11 are denoted by the same step numbers.

First, the processing of step S901 through S905 is similar to the processing described with reference to the flowchart of FIG. 11 and, therefore, will not be described again.

When the processing application folder path determination processing is accomplished in step S905, the print system 601 performs folder creation processing in step S1101. The folder creation processing performed in step S1101 will be described in detail with reference to FIG. 14.

Here, the folder creation processing of step S1101 will be described with reference to FIG. 14.

Figure 14:
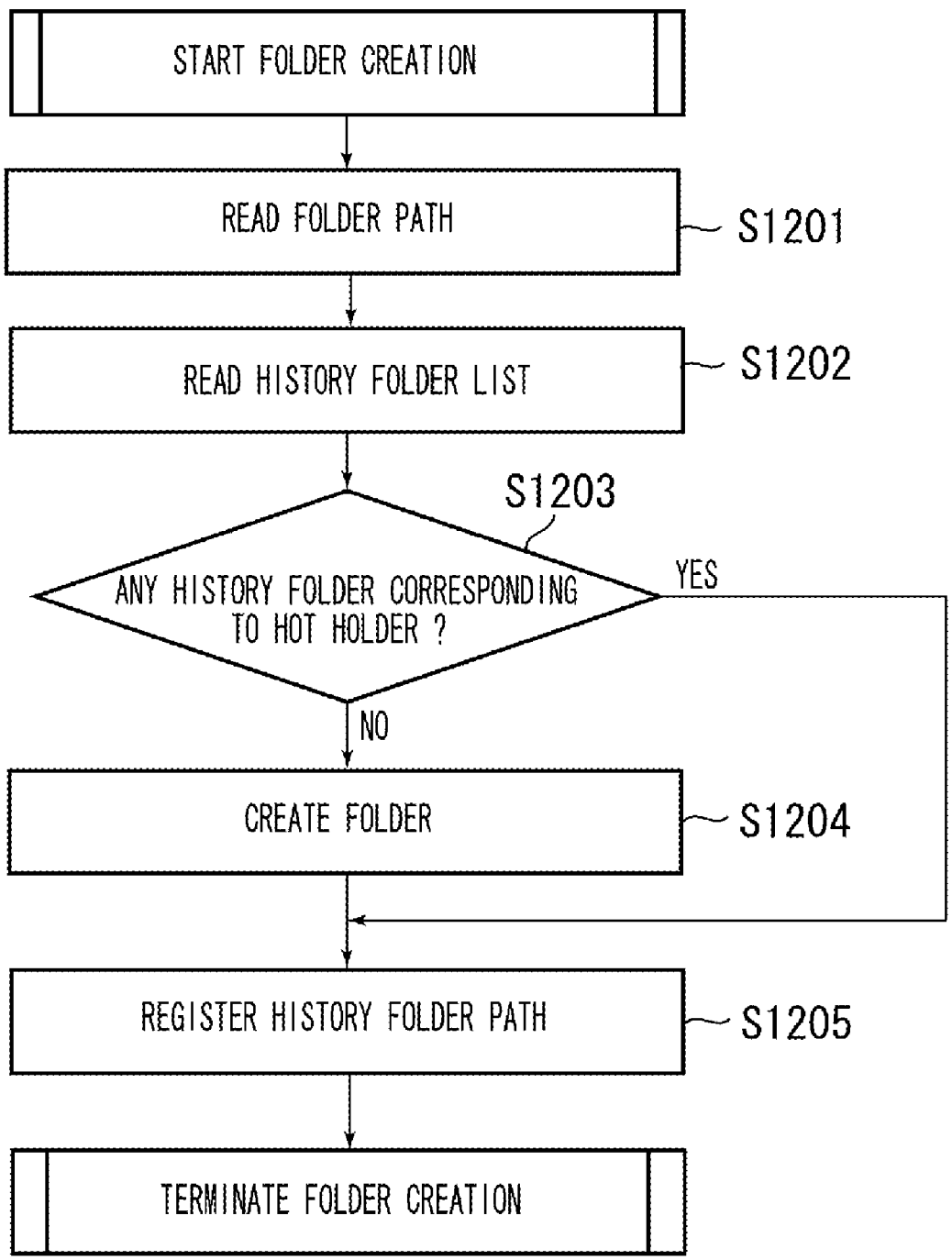
FIG. 14 is a flowchart showing an example of another control processing procedure according to an exemplary embodiment.

FIG. 14 is a flowchart showing an example of a control processing procedure according to an exemplary embodiment. The processing shown in FIG. 14 corresponds to the folder creation processing performed in step S1101 of FIG. 13.

First, in step S1201, the print system 601 reads the processing application folder path determined in step S905 from a predetermined area of the RAM 202.

Second, in step S1202, the print system 601 obtains a history folder list from the folder read in step S1201.

Then, in step S1203, the print system 601 retrieves a history folder corresponding to the target hot folder from the history folder list obtained in step S1202. In this case, as a method for correlating a history folder with a hot folder, each history folder can include information relating to a corresponding hot folder or the hot folder monitoring section 603 can store a correlation table.

If a history folder corresponding to the target hot folder is present (i.e., YES in step S1203), the processing flow proceeds to step S1205.

On the other hand, when no history folder corresponding to the target hot folder is present (i.e., NO in step S1203), the processing flow proceeds to step S1204. Then, in step S1204, the print system 601 creates a history folder in the folder read in step S1201. Then, the processing flow proceeds to step S1205.

Next, in step S1205, the print system 601 updates and stores a path of the history folder corresponding to the target hot folder (i.e., the history folder created in step S1204 or the history folder confirmed in step S1203) as a processing application folder path in the RAM 202. Then, the print system 601 terminates the processing of this routine.

Now referring back to the processing of the flowchart shown in FIG. 13, after the print system 601 accomplishes the folder creation processing of step S1101, the processing flow proceeds to step S906. The processing of steps S906 through S909 is similar to the processing shown in FIG. 11 and, therefore, will not be described again.

As described above, according to the present exemplary embodiment, after the job processing of print data entered into the hot folder is accomplished, the print data can be automatically (without any intentional operation by a user) returned to the history folder created as a subordinate holder of the print data move source folder.

Thus, compared to the conventional system, no complicated work (e.g., backup copy of an input file as a preparatory work and retrieval of the file as a post-processing work) is required to reuse the input file. Furthermore, the processing state and result can be easily confirmed by checking the presence or contents of a log file. Thus, the usability of the print system can be greatly improved.

Accordingly, the present exemplary embodiment can realize a print system using a hot folder with higher usability compared to the conventional system.

Third Exemplary Embodiment

The above-described second exemplary embodiment includes the folder creation processing (refer to step S1101 of FIG. 13) to create a history folder on an input source folder path so as to correspond to each hot folder and store the information in the history folder. In short, the second exemplary embodiment can perform one-to-one folder creation processing.

It is also useful to create a history folder commonly usable for a plurality of hot folders. To this end, the third exemplary embodiment provides an arrangement for commonly using a history folder for a plurality of hot folders to realize one-to-plural folder creation processing.

The arrangement of the present exemplary embodiment can be combined with the aforementioned arrangement to store data files and history information in plural history folders corresponding to plural folders in a common folder used for plural hot folders.

Next, the processing of the print system 601 according to the third exemplary embodiment will be described in detail with reference to FIG. 15.

Figure 15:
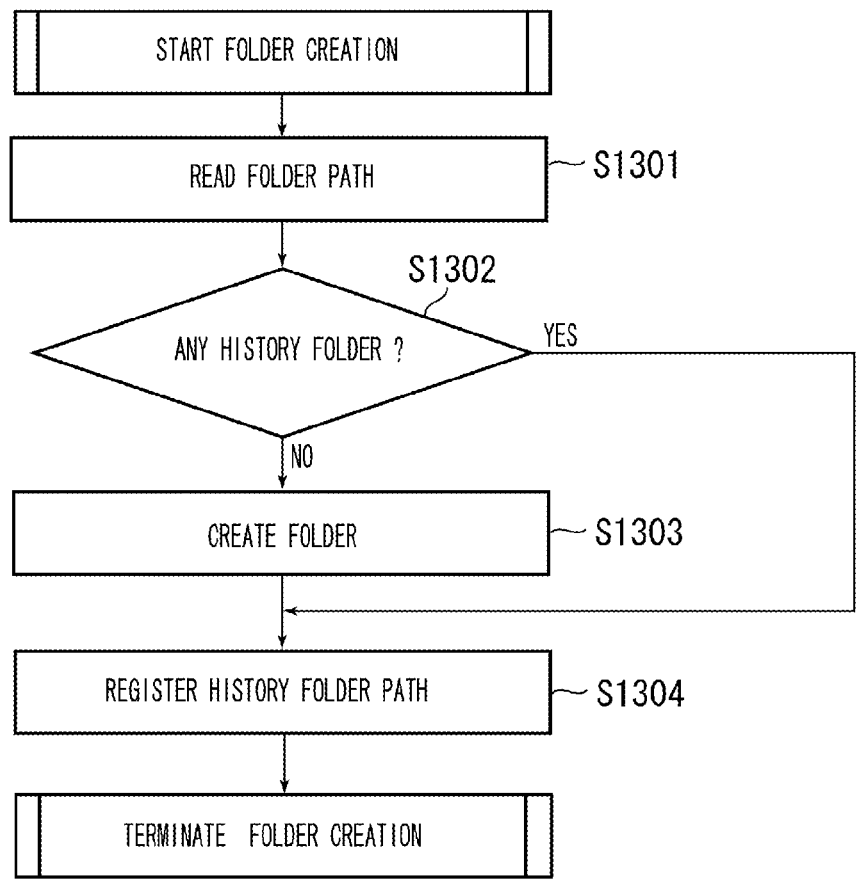
FIG. 15 is a flowchart showing an example of another control processing procedure according to an exemplary embodiment.

FIG. 15 is a flowchart showing an example of a control processing procedure according to an exemplary embodiment. The processing shown in FIG. 15 corresponds to the folder creation processing performed in step S1101 of FIG. 13.

First, in step S1301, the print system 601 reads the processing application folder path determined in step S905 from a predetermined area of the RAM 202.

In step S1302, the print system 601 determines whether a history folder corresponding to the target hot folder read in step S1301 is present. If a corresponding history folder is present (i.e., YES in step S1302), the processing flow proceeds to step S1304.

On the other hand, when no history folder is present (i.e., NO in step S1302), the processing flow proceeds to step S1303. Then, in step S1303, the print system 601 creates a new history folder in the folder read in step S1301. Then, the processing flow proceeds to step S1304.

Next, in step S1304, the print system 601 updates and stores a path of the history folder (i.e., the history folder created in step S1303 or the history folder detected in step S1302) as a processing application folder path in RAM 202. Then, the print system 601 terminates the processing of this routine.

As described above, according to the present exemplary embodiment, after the job processing of print data entered into the hot folder is accomplished, the print data can be automatically (without any intentional operation by a user) returned to the common history folder created as a subordinate folder of the print data move source folder.

Thus, compared to the conventional system, no complicated work (e.g., backup copy of an input file as a preparatory work and retrieval of the file as a post-processing work) is required to reuse the input file. Furthermore, the processing state and result can be easily confirmed by checking the presence or contents of a log file. Thus, the usability of the print system can be greatly improved.

Accordingly, the present exemplary embodiment can realize a print system using a hot folder with higher usability compared to the conventional system.

Fourth Exemplary Embodiment

The above-described second and third exemplary embodiments can create a history folder as a subordinate folder of the input source folder in response to entry of print data into the hot folder and can move and save the print data together with a log file into the created folder.

The fourth exemplary embodiment includes the processing for detecting an input source folder, creating a log file in the detected folder, and saving a processing result of print data and link information of the print data into the created log file.

In the present exemplary embodiment, the action information setting section 602 shown in FIG. 6 includes the hot folder setting screen shown in FIG. 7 and a later-described log file processing setting screen shown in FIG. 16, which serves as a user interface.

Figure 16:
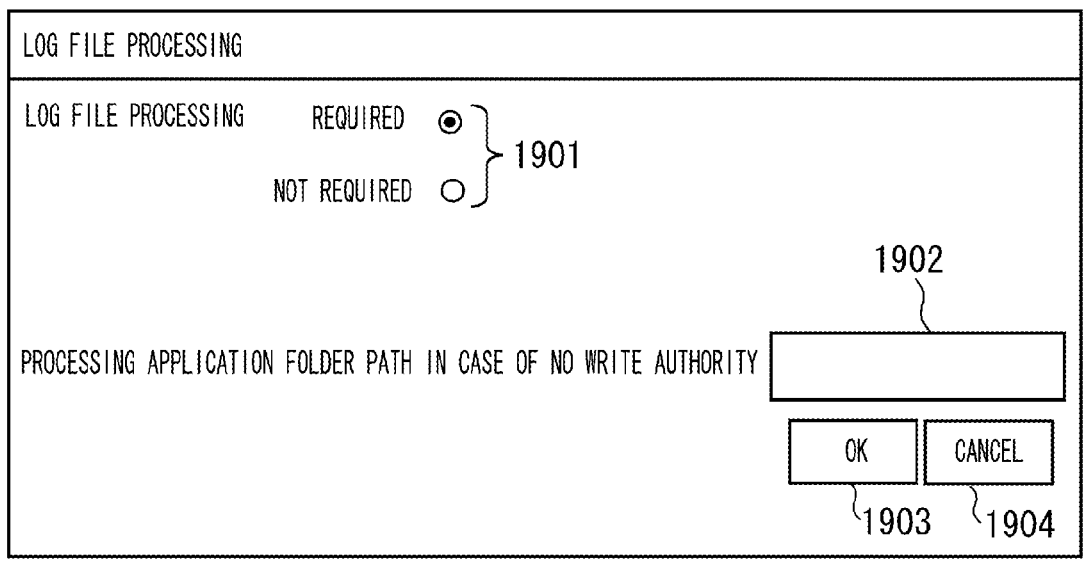
FIG. 16 illustrates an example of a log file processing setting screen according to a fourth exemplary embodiment of the present invention.

FIG. 16 illustrates an example of a log file processing setting screen according to the fourth exemplary embodiment. The action information setting section 602 can control the display unit 207 to display the log file processing setting screen shown in FIG. 16 when a user clicks the print data entry/log file processing setting button 1704 (refer to FIG. 7) with the pointing device (not shown).

In FIG. 16, a field 1901 enables a user to determine whether the log file processing is "required" or "not required." If the log file processing is "required", the print system 601 creates a print processing log in the input source folder. On the other hand, when the log file processing is "not required", no print processing log file is created.

A field 1902 enables a user to input a processing application folder path available if the user has no write authority for the input source folder. Thus, when no write authority for the input source folder is present, a user can create an alternate folder of the input source folder by designating a path of a folder storing print data file through the field 1902 so that the print data can be reused.

When a user clicks an OK button 1903 with the pointing device (not shown), the action information setting section 602 makes effective the setting information on the log file processing setting screen and terminates the log file processing setting screen.

When a user clicks a cancel button 1904 with the pointing device (not shown), the action information setting section 602 cancels the setting information on the print data entry/log file processing setting screen and terminates the log file processing setting screen.

Figure 17:
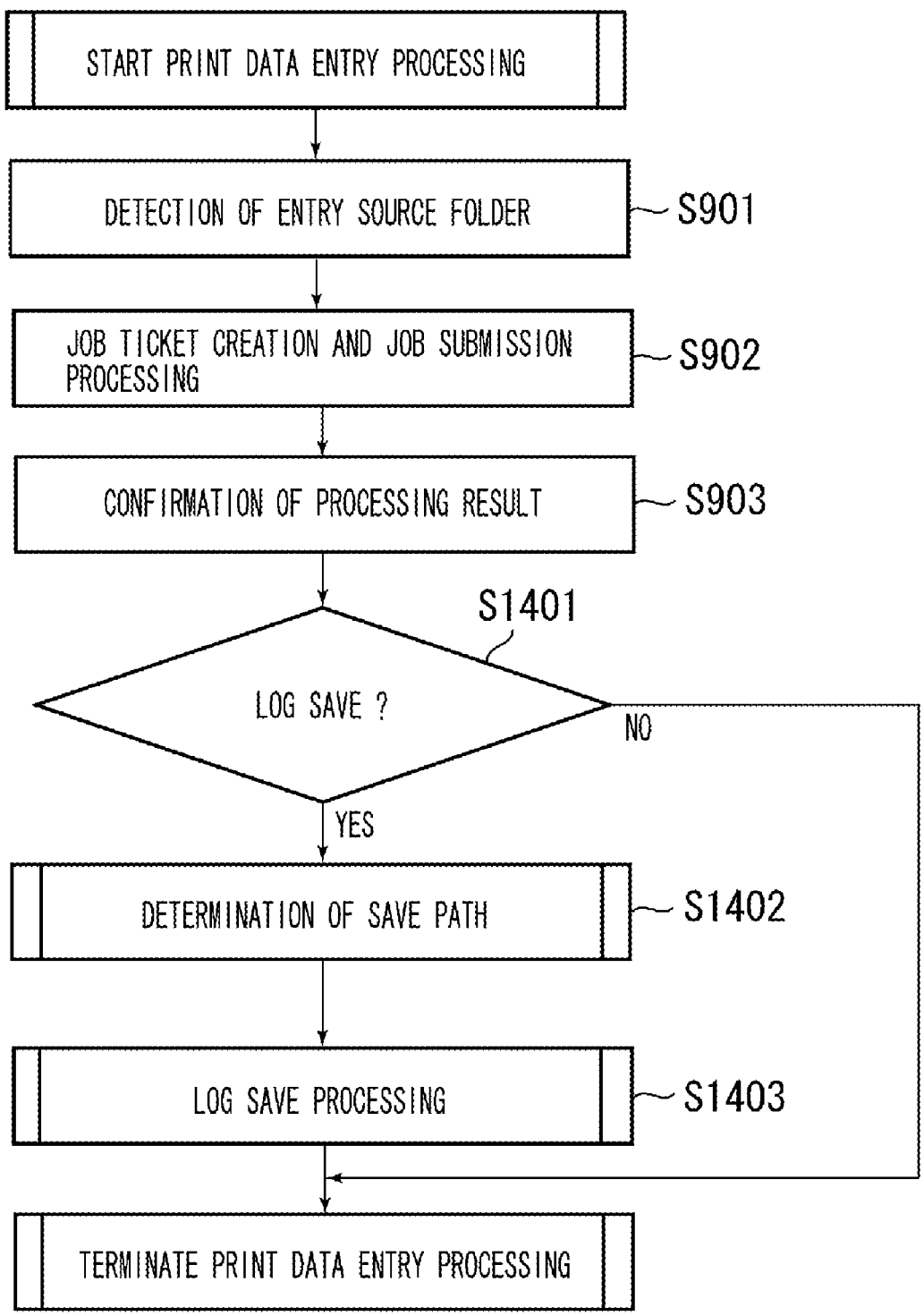
FIG. 17 is a flowchart showing an example of another control processing procedure according to an exemplary embodiment.

FIG. 17 is a flowchart showing an example of a control processing procedure according to an exemplary embodiment. The processing shown in FIG. 17 corresponds to the print data entry processing performed in step S802 of FIG. 10. In FIG. 17, steps similar to the steps shown in FIG. 11 are denoted by the same step numbers.

First, the processing of steps S901 through S903 is similar to the processing shown in FIG. 11 and, therefore, will not be described again.

After the processing result confirmation processing in step S903 is accomplished, the print system 601 determines whether a log can be saved (refer to step S1401). More specifically, in step S1401, the print system 601 determines execution of the log information processing when no error is detected in the above-described processing of step S903 and the action information setting section 602 (refer to item 1901 shown in FIG. 16) determines that the log file processing is "required."

It is also useful that the print system 601 determines execution of the log information processing if the action information setting section 602 (refer to item 1901 shown in FIG. 16) determines that the log file processing is "required" regardless of a detection result with respect to the presence of error.

If the log file processing is "required" (i.e., YES in step S1401), the print system 601 executes save path determination processing in step S1402. The save path determination processing performed in step S1402 will be described in detail with reference to the flowchart of FIG. 18.

Here, the save path determination processing of step S1402 will be described with reference to FIG. 18.

Figure 18:
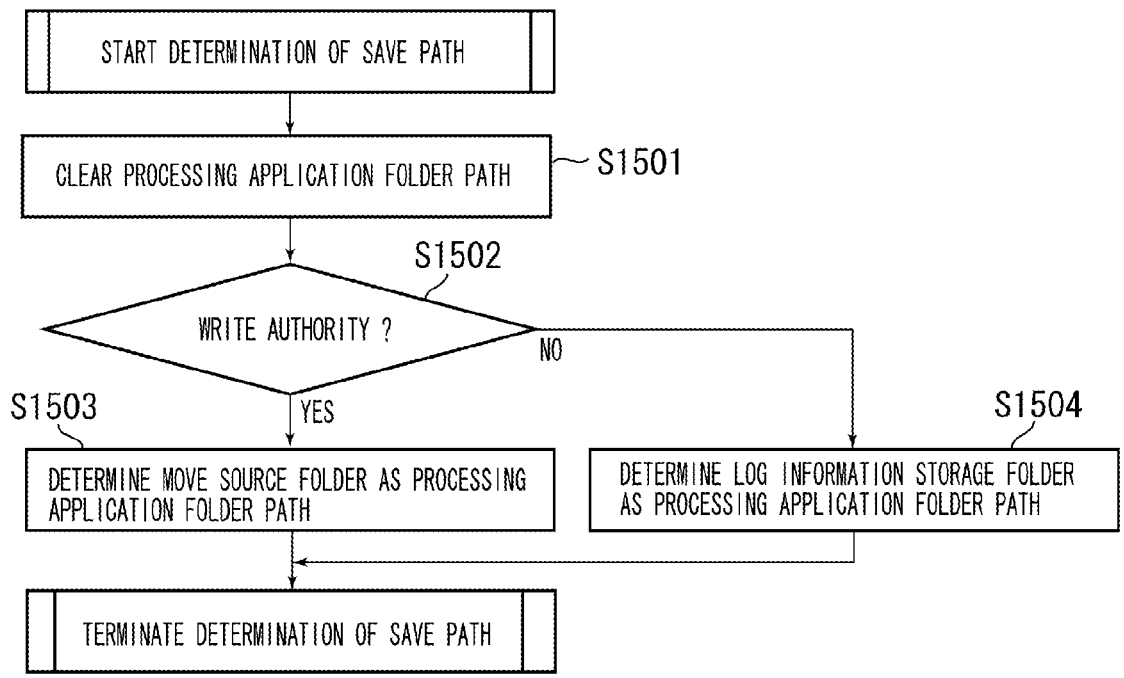
FIG. 18 is a flowchart showing an example of another control processing procedure according to an exemplary embodiment.

FIG. 18 is a flowchart showing an example of a control processing procedure according to an exemplary embodiment. The processing of FIG. 18 corresponds to the save path determination processing performed in step S1402 of FIG. 17.

First, in step S1501, the print system 601 clears information relating to any processing application folder path stored in a predetermined area of the RAM 202.

In step S1502, the print system 601 determines whether the write authority for a move source folder is present. If the write authority for the move source folder is present, the processing flow proceeds to step S1503.

In step S1503, the print system 601 stores the move source folder as a processing application folder path in the RAM 202 and terminates the processing of this routine.

On the other hand, when no write authority for the move source folder is present (i.e., NO in step S1502), the processing flow proceeds to step S1504.

In step S1504, the print system 601 reads a processing application folder path of the print data. More specifically, the print system 601 reads the log information storage folder path determined by the action information setting section 602 (refer to item 1902 shown in FIG. 16), and stores the log information storage folder path as a processing application folder path in the RAM 202. Then, the print system 601 terminates the processing of this routine.

Now referring back to the processing of the flowchart shown in FIG. 17, after the print system 601 terminates the save path determination processing of step S1402, the processing flow proceeds to step S1403 to execute log save processing and terminates the processing of this routine.

Figure 19:
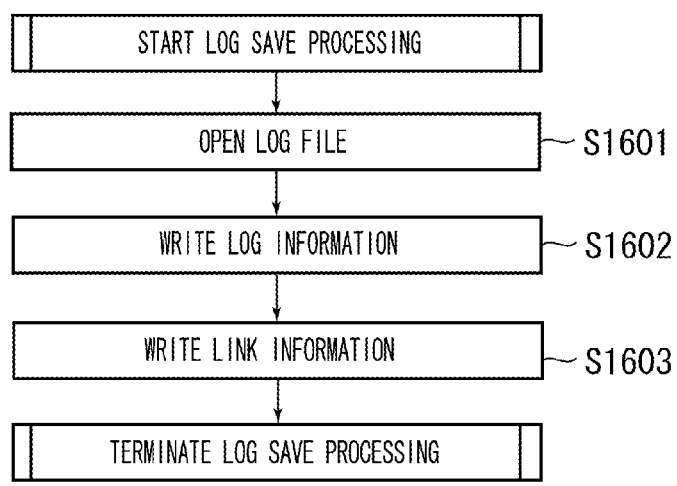
FIG. 19 is a flowchart showing an example of another control processing procedure according to an exemplary embodiment.

The log save processing performed in step S1403 is the processing for writing the log information of entered print data into a predetermined log file. FIG. 19 shows the details of the processing performed in step S1403.

Here, the log save processing of step S1403 will be described with reference to FIG. 19.

FIG. 19 is a flowchart showing an example of a control processing procedure according to an exemplary embodiment. The processing shown in FIG. 19 corresponds to the log save processing performed in step S1403 of FIG. 17.

First, in step S1601, the print system 601 opens the log file according to the log information storage folder path determined in step S1402 of FIG. 17. If no log file is present, the print system 601 creates a new file and opens the newly created file. The log file can be provided for each hot folder or can be commonly provided for a plurality of hot folders.

Next, in step S1602, the print system 601 writes log information (e.g., a print processing result of print data) into the log file. Then, the processing flow proceeds to step S1603.

Next, in step S1603, the print system 601 writes link information of the entered print data into the log file. As described in the aforementioned second and third exemplary embodiments, it is useful to separately provide a storage folder for the print data and store the print data into the separately provided folder after the job submission processing is accomplished. The link information of the print data stored in the folder can be written into the log file.

When the processing of step S1603 is accomplished, the print system 601 terminates the processing of this routine.

Figure 20:
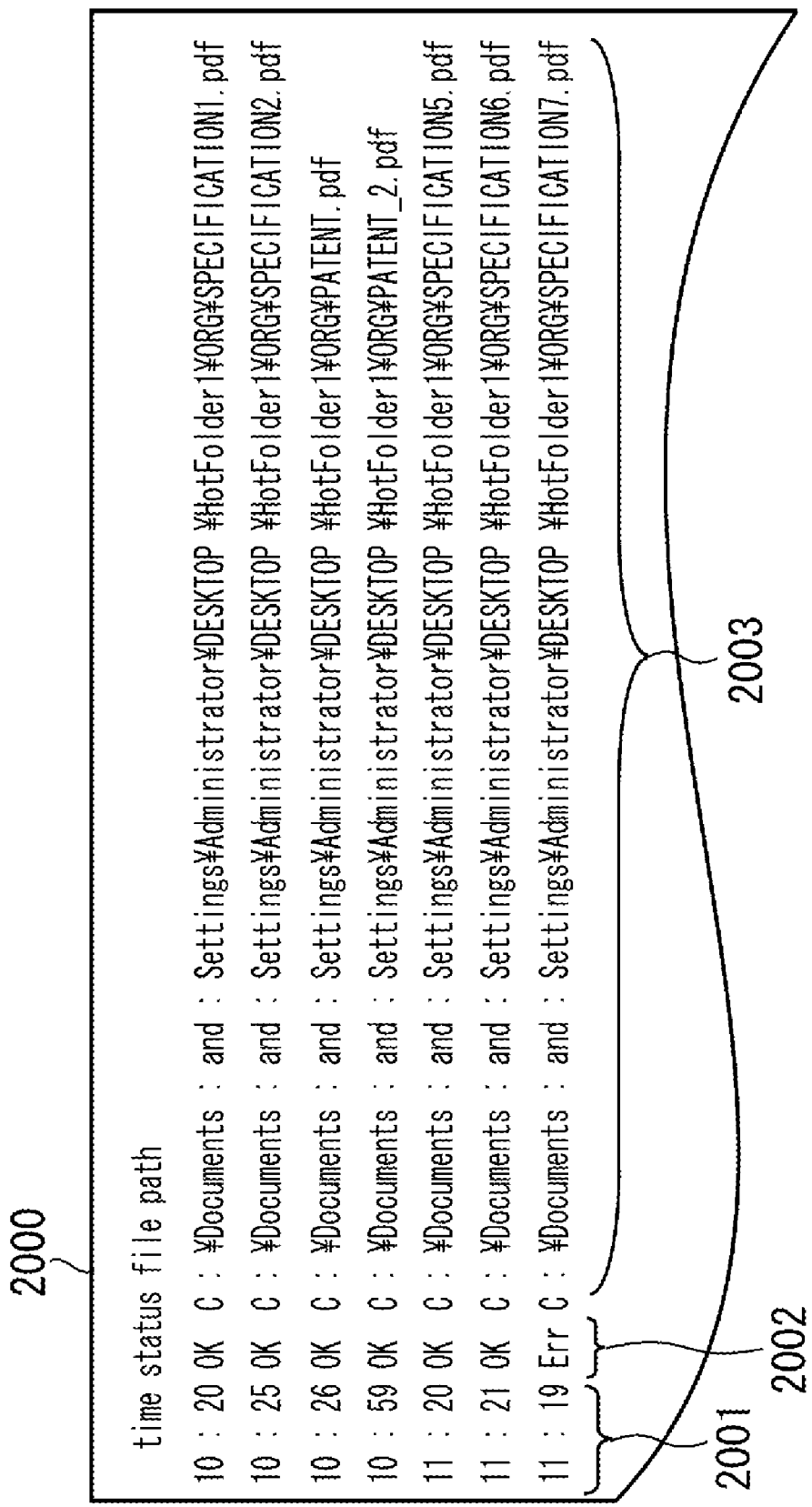
FIG. 20 illustrates an example of a log file used in the fourth exemplary embodiment.

FIG. 20 illustrates an example of a log file used in the fourth exemplary embodiment.

A log file 2000 shown in FIG. 20 includes a time field 2001 indicating the processing time (e.g., date) of print data, a status field 2002 indicating the processing result of print data, and a file path field 2003 indicating the link information of entered print data. A user can instruct re-input (re-entry) of a print processing job, if failed, with reference to the log file. Additionally, a user may identify the source of trouble.

As described above, according to the present exemplary embodiments, after the job processing of print data entered into the hot folder is accomplished, the log file describing the storage location of the print data (i.e. field 2003 shown in FIG. 20) can be automatically (without any intentional operation by a user) created in the move source folder. Thus, compared to the conventional system, no complicated work (e.g., retrieval of the file) is required to reuse the input file.

Accordingly, the present exemplary embodiment can realize a print system using a hot folder with higher usability compared to the conventional system.

The arrangements, contents, and screens of the aforementioned various data are not limited to the disclosed ones and, therefore, can be variously modified depending on the purpose of use.

The present invention can be realized, for example, as a system, an apparatus, a method, a program, or a storage medium. More specifically, the present invention can be applied to a system including plural devices or a single device.

In the above-described exemplary embodiments, the information processing apparatus has been described as a device for executing print processing of the data entered in the hot folder. However, the processing performed by the information processing apparatus according to the present invention is not limited to print processing of the data entered into the hot folder.

For example, an information processing apparatus according to an exemplary embodiment can transmit a mail including the data entered into the hot folder to a mail address set beforehand in the hot folder. Moreover, an information processing apparatus according to an exemplary embodiment can transmit an encrypted mail according to a predetermined encryption method.

Additionally, an information processing apparatus according to an exemplary embodiment can transmit a facsimile document to a predetermined facsimile number. It is also useful to register predetermined database processing. In short, the present invention can be applied to any processing of the information processing apparatus performed on the data entered into the hot folder.

In the above-described exemplary embodiments, the input data of the hot folder can be returned to the move source folder (or to the history folder) at arbitrary timing, for example, when the print processing of the input data is accomplished, or when the transmission of the input data to a printing apparatus is accomplished. It is also useful to create and save a copy of the data at the timing the data is entered into the hot folder and promptly return the input data to the move source folder (or to the history folder).

Next, with reference to the memory map shown in FIG. 4, an exemplary memory map arrangement of a storage medium storing various data processing programs readable by the information processing apparatus according to the present invention will be described.

Although not shown in FIG. 4, the storage medium can store management information for the programs stored in the storage medium, version information, creator name, and information depending on the OS that reads the programs, e.g., icons discriminately displaying the programs.

Furthermore, a directory of the storage medium can manage data belonging to various programs. Moreover, the storage medium can store a program for installing various programs on a computer and a decompression program if the installed program is compressed.

To realize the processing shown in the flowcharts of FIGS. 10, 11, 12, 13, 14, 15, 17, 18, and 19, it is useful to provide a program from an external device and install the program on a host computer so that the host computer can execute the installed program. In this case, the information including the program can be supplied from an external storage medium to an output apparatus via a portable storage medium, such as a CD-ROM, a flash memory, and an FD, or can be transmitted via a network.

Furthermore, software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer, such as a storage (or recording) medium storing the program code. In this case, the type of program can be any one or combination of object code, interpreter program, and OS script data.

A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web page on the Internet using the browsing function of a client computer, when the web page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web pages. Namely, the present invention encompasses WWW servers that allow numerous users to download the program files so that the functions or processes of the present invention can be realized on their computers.

Furthermore, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Furthermore, an operating system (OS) or other application software running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

As described above, according to exemplary embodiments, after the job processing for a file entered into the hot folder is accomplished, the data relating to the job (e.g., an input file or a log file) can be automatically returned to a source of the file.

Thus, compared to the conventional system, no complicated work (e.g., backup copy of an input file as a preparatory work and retrieval of the file as a post-processing work) is required to reuse the input file. Furthermore, the processing state and result can be easily confirmed by checking the presence or contents of a log file. Thus, the usability of the print system can be greatly improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-365902 filed Dec. 20, 2005, which is hereby incorporated by reference herein in its entirety.

What is claimed is:

1. An information processing apparatus including a processor comprising:
   a processing condition setting unit configured to set a processing condition for performing data processing using a data file entered into a processing folder;
   a determination unit configured to determine entry of the data file from an input source folder into the processing folder;
   a processing unit configured to perform the data processing using the data file entered from the input source folder into the processing folder, based on the processing condition set by the processing condition setting unit; and
   a transfer unit configured to transfer the data file, entered from the input source folder into the processing folder, back to the input source folder,
   wherein the transfer unit transfers the data file, entered from the input source folder into the processing folder, into an alternate folder different from the input source folder in a case where the data file cannot be transferred back to the input source folder, and
   wherein the data processing of the processing unit is performed by the processor included in the information processing apparatus.

2. The information processing apparatus according to claim 1, wherein when the transfer unit transfers the data file back to the input source folder, the transfer unit transfers the data file into a sub folder in the input source folder.

3. The information processing apparatus according to claim 1, wherein the information processing apparatus has a plurality of processing folders, and
   wherein when the transfer unit transfers the data file back to the input source folder, the transfer unit transfers the data file into one of a plurality of folders in the input source folder, the plurality of folders respectively corresponding to the plurality of processing folders.

4. The information processing apparatus according to claim 1, wherein the information processing apparatus has a plurality of processing folders, and
   wherein when the transfer unit transfers the data file back to the input source folder, the transfer unit transfers the data file into a common folder in the input source folder, the common folder corresponding to the plurality of processing folders.

5. The information processing apparatus according to claim 1, further comprising a log storage unit configured to store, into the input source folder, log information including a processing result of the data processing performed by the processing unit using the data file entered from the input source folder into the processing folder.

6. The information processing apparatus according to claim 1, wherein the data processing job includes one of:
   a print processing for causing a printing apparatus to perform print processing of the data file based on print settings set by the processing condition setting unit;
   a first mail transmission processing for transmitting a mail including the data file based on destination settings set by the processing condition setting unit;
   a second mail transmission processing for transmitting an encrypted mail including the data file based on destination settings and encryption settings set by the processing condition setting unit; and
   a facsimile transmission processing for transmitting a facsimile document including the data file based on destination settings set by the processing condition setting unit.

7. A method for processing information, comprising:
   setting a processing condition for performing data processing using a data file entered into a processing folder;
   determining entry of a data file from an input source folder into the processing folder;
   performing the data processing using the data file entered from the input source folder into the processing folder, based on the set processing condition; and
   transferring the data file, entered from the input source folder into the processing folder, back to the input source folder
   wherein the data file, entered from the input source folder into the processing folder, is transferred into an alternate folder different from the input source folder in a case where the data file cannot be transferred back to the input source folder.

8. A computer-readable storage medium storing a program for processing information, the program comprising:
   computer-executable instructions for setting a processing condition for performing data processing using data file entered into a processing folder;
   computer-executable instructions for determining entry of a data file from an input source folder into the processing folder;
   computer-executable instructions for performing the data processing using the data file entered from the input source folder into the processing folder, based on the processing condition; and
   computer-executable instructions for transferring the data file, entered from the input source folder into the processing folder, back to the input source folder,
   wherein the data file, entered from the input source folder into the processing folder, is transferred into an alternate folder different from the input source folder in a case where the data file cannot be transferred back to the input source folder.

* * * * *